Jan. 17, 1961 W. E. MONBECK ET AL 2,968,705
ELECTRICAL LOAD TRANSFER SYSTEM
Filed Dec. 9, 1958 4 Sheets-Sheet 3

INVENTORS:
Wayne E. Monbeck
Charles B. Martz

By Willard M. Graham
Agent

Jan. 17, 1961 W. E. MONBECK ET AL 2,968,705
ELECTRICAL LOAD TRANSFER SYSTEM
Filed Dec. 9, 1958 4 Sheets-Sheet 4

INVENTORS:
Wayne E. Monbeck
Charles B. Martz

By Willard M. Graham
Agent.

United States Patent Office 2,968,705
Patented Jan. 17, 1961

2,968,705

ELECTRICAL LOAD TRANSFER SYSTEM

Wayne E. Monbeck, San Pedro, and Charles B. Martz, Redondo Beach, Calif., assignors to Northrop Corporation, Beverly Hills, Calif., a corporation of California Filed Dec. 9, 1958, Ser. No. 779,241

10 Claims. (Cl. 200—18)

The present invention relates to electrical power systems, and more particularly, to circuitry and mechanical means for transferring without interruption electrical power consumed by aircraft components from an external ground power supply to an airborne power supply installed in the aircraft, and vice versa.

In the case of large aircraft, missiles, and the like, it is becoming more and more usual to provide externally connected supply systems such as electric, hydraulic, and fuel, for example. These ground electrical systems have, as the electrical power demand of present day aircraft has increased rapidly, become necessarily more complex and heavy, both in total power capability and in types of electrical power required. Since the aircraft power supplies must be connected and the ground power supplies disconnected before take-off, of course, a power transfer system is necessary.

A power transfer system requires exceptionally heavy additional components such as fast-acting high-current switching contactors, busses, load controls, and synchronizing devices for the A.C. power supplies. Addition of these switches and controls in the aircraft presents space and weight problems.

It is an object of this invention to provide an improved electrical load transfer and power distribution system wherein a minimum of extra weight is imposed on the aircraft, and inflight reliability is increased over that of conventional systems.

A further object is to provide a power transfer switching circuit wherein the aircraft-mounted components are not required to carry heavy switching currents, but only continuous currents.

Another object is to provide a power transfer system therein isolation, electrical protection, and independent control of electrical loads is provided while deriving power from the external power source.

Still another object of the present invention is to provide a multiple-pole positive acting switching device especially suited for aircraft installation by being relatively light, compact and rugged.

It is a still further object to provide automatic means for deenergizing the leads between an aircraft alternator and the surface of the aircraft (umbilical disconnect) where electrical connections are made between the aircraft and ground support equipment.

Briefly, our invention comprises a main aircraft power circuit from the airborne A.C. power supply through a load switch device to the aircraft electrical load components, a parallelling circuit from the airborne A.C. power supply through an external ground control unit and back through the aircraft load switch to the load components, means in the ground control unit for switching the supply of power through the parallelling circuit from a ground power supply to the airborne power supply, and means in the aircraft load switch device to close the main power circuit and open the parallelling circuit. The aircraft load switch includes individual load circuit switches, novel rotating bus bars forming the poles of the latter switches, and snap-action auxiliary switches, with positive acting actuating means for switching from the paralleling circuit to the main circuit and vice versa if desired.

Other objects and a full understanding of the present invention will be realized by reference to the detailed description of a specific apparatus to follow, and to the accompanying drawings, shown by way of illustration and not limitation.

Figure 1:
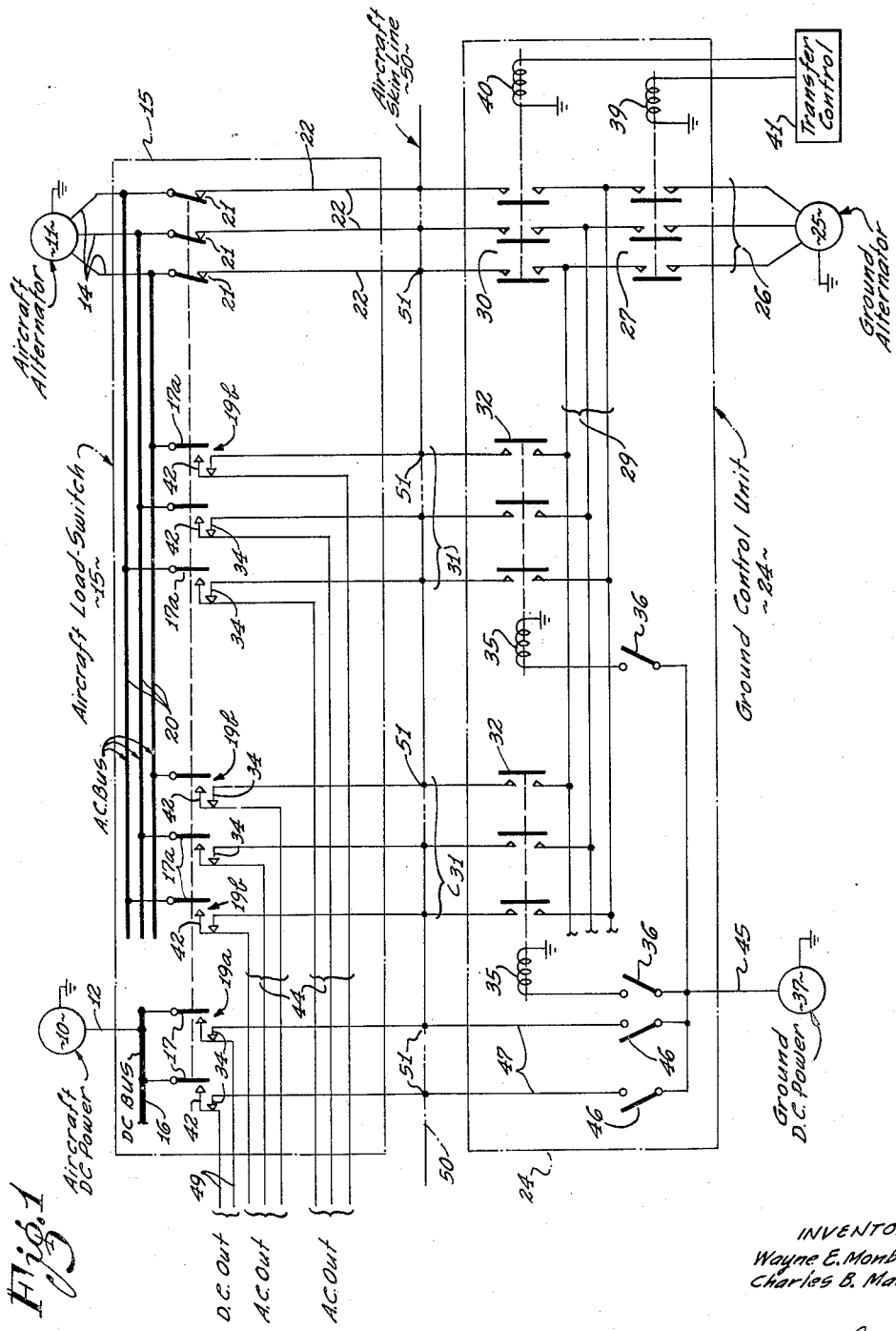
Figure 1 is a schematic diagram showing broadly the circuitry of the entire load transfer and power distribution system.

Referring first to Figure 1 for a detailed description of our invention, a D.C. power supply 10 and an A.C. power supply such as a three-phase alternator 11 are installed in an aircraft, and have their supply leads 12 and 14 respectively going into a load switch assembly 15 also mounted in the aircraft. In Figure 1, the busses and switches in load switch assembly 15 are shown purely schematically, for electrical clarity. Actual physical arrangement is different, and will be completely described and shown later herein. Within the load switch assembly 15, the D.C. supply lead 12 connects to a D.C. bus 16 to which are connected bus contacts 17, which are the actuating elements of a number of make-before-break load switches 19a, one for each D.C. load circuit. Similarly, the A.C. supply leads 14 connect to three phase busses 20, one per phase respectively, and each phase bus 20 has connected thereto the bus contacts 17a of a number of similar load switches 19b. It will be shown later how elements 16 and 17 are integral, each element 20 and its associated element 17a are integral, and how they operate their associated load switches approximately simultaneously.

The A.C. busses 20 also connect to three respective paralleling contacts 21 which are closed when the bus contacts 17 and 17a are open. From the paralleling contacts 21, paralleling leads 22 pass out of the load switch assembly 15 and into a ground control unit 24 outside of the aircraft.

An external ground A.C. power supply such as a three-phase ground alternator 25 has supply leads 26 entering the ground control unit 24 where they are connectable by means of a set of first transfer relay contacts 27 to respective A.C. ground control unit busses 29. The paralleling leads 22 from aircraft load switch assembly 15 are connectable by means of a set of second transfer relay contacts 30 to the respective A.C. ground busses 29.

The A.C. ground busses 29 have a number of load circuit leads 31 in groups of three (one for each phase) connected through coupling relay contacts 32 to respective fixed contacts 34 of the load switches 19b in the load switch assembly 15. Each set of coupling relay contacts 32 may be independently controlled by one of a plurality of coupling relay coils 35 energizable by separate coupling switches 36 from a 28-volt D.C. ground power supply 37, for example. Single phase A.C. loads (not shown) can be similarly controlled. First and second transfer relay contacts 27 and 30 are respectively actuated by a first transfer coil 39 and a second transfer coil 40 energized as required by a transfer control device 41, located on the ground, for example. Transfer control device 41 is not a part of the present invention.

In the load switch assembly 15, each load switch 19b connected to the A.C. aircraft busses 20 has a movable contact 42 to which an A.C. output lead 44 is connected. The other ends (not shown) of the A.C. output leads 44 lead to further load distribution points (not shown) and/or to the electrical components utilizing this three-phase A.C. power. In the "external" or "ground" position shown for the load switch assembly 15, the movable contact 42 of each load switch 19 is spring-loaded closed on the fixed contact 34, the bus contacts 17 and 17a are open, and the paralleling contacts 21 are closed. When actuated to the "aircraft" position (as will be described later), the bus contacts 17 and 17a are closed on the movable contact 42, the fixed contact 34 is open, and the paralleling contacts 21 are open.

The ground D.C. power supply 37 has a supply lead 45 entering the ground control unit 24. Individual D.C. activating switches 46 may be provided to energize coupling leads 47 which go into the aircraft load switch assembly 15 and connect with respective fixed contacts 34 of the D.C. load switches 19a. These D.C. load switches have movable contacts 42 which operate simultaneously with the A.C. load switch movable contacts 42, and a D.C. output lead 49 is connected to each of the D.C. movable contacts 42, to pass out of the load switch assembly 15 to D.C.-operated aircraft equipment.

The circuits described up to this point operate in the following manner. The starting condition is with the ground power supplies turned on and operating, load switch assembly 15 in "external" position, first and second transfer relay contacts 27 and 30 open, coupling switches 36 and activating switches 46 open. Thus, no power is being fed to any aircraft loads. First, the first transfer relay contacts 27 are closed, to apply power from the three-phase ground alternator 25 to the A.C. ground busses 29. Next, power from the A.C. ground busses 29 is applied to typical A.C. aircraft loads by closing appropriate coupling switches 36 to cause closure of respective associated coupling relay contacts 32. This of course supplies A.C. power from load circuit leads 31 to A.C. output leads 44 through the closed fixed contacts 34 and movable contacts 42 of the associated A.C. load switches 19b. D.C. aircraft loads may similarly be energized by closing D.C. activating switches 46 as desired. When all aircraft loads are energized, the aircraft power supplies are started. Next, the aircraft alternator 11 is paralleled with the ground alternator 25 by closing second transfer relay contacts 30, as controlled by the transfer control device 41, taking into account synchronization of the two alternators. After real and reactive load components are transferred from ground alternator 25 to aircraft alternator 11 by means of the usual alternator controls, the ground alternator 25 is disconnected by opening the first transfer relay contacts 27, from the transfer control device 41. Power from the aircraft alternator 11 is now supplying the aircraft loads, but through the paralleling circuitry which passes through the ground control unit 24. Lastly, the load switch assembly 15 is switched from "external" to "aircraft" position, to electrically isolate the aircraft (both D.C. and A.C.) from the ground control unit 24 without interrupting power to the aircraft loads. This latter switching first closes the bus contacts 17 and 17a to the movable contacts 42, further movement opening the movable contacts 42 from the fixed contacts 34 and substantially simultaneously opening the paralleling contacts 21.

No paralleling circuits are shown for the D.C. aircraft circuit as for the A.C. circuits. It would be obvious, however, to provide a D.C. paralleling circuit similar to the described A.C. circuitry if desired, so that the D.C. load switches 19a would not be required to make or break loads.

It will be noted that the paralleling leads 22, A.C. load circuit leads 31, and D.C. coupling leads 47 pass through the aircraft skin 50 at disconnect points 51 which form portions of one or more disconnectable plug and socket assemblies (not physically shown) by which the aircraft and ground control unit 24 are completely separated after the ground supplied functions are completed. The paralleling contacts 21 are provided in order to remove the 200-volt phase-to-phase A.C. voltage from the aircraft skin-mounted receptacle, illustrated by the three right-hand disconnect points 51, so as to eliminate a hazard and possible source of malfunction.

This invention does not restrict the transfer operation to the foregoing steps only. Power is capable of being transferred between the ground power supply and the aircraft power supply as desired, before the load switch assembly 15 is actuated from "external" to "aircraft," by alternate closing and opening of first and second transfer relay contacts 27 and 30. Also, the load switch assembly 15 is capable of switching between the "aircraft" position and "external" as required.

Figure 2:
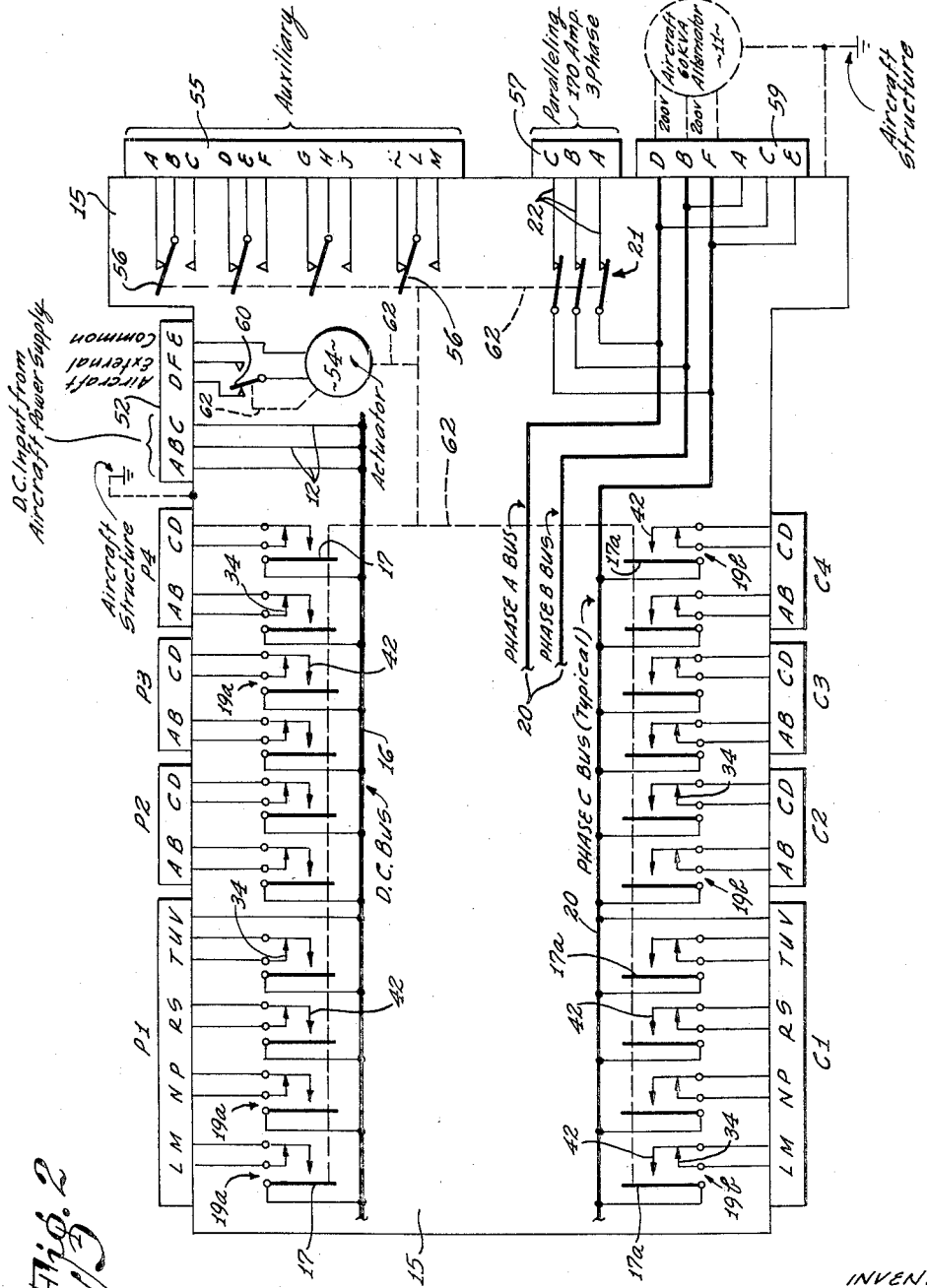
Figure 2 is a complete schematic diagram of the aircraft load switch device indicated in Figure 1.

The aircraft load switch assembly 15, which forms an important part of the present invention, will now be described. Figure 2 is a schematic diagram of this assembly. Plugs P1 through P4 handle D.C. load circuits in from the ground and out to the aircraft loads. Plugs C1 through C4 handle phase C of the three-phase A.C. load circuits in from the ground and out to the aircraft loads. Two other sets of such plugs (not shown) handle the other two phases A and B identically. A D.C. power plug 52 brings in D.C. power to the D.C. bus 16 through pins A, B, and C, and three control leads through pins D, E, and F for a load switch actuator 54. An auxiliary plug 55 carries switch leads for a set of auxiliary switches 56 operated by the assembly. A paralleling plug 57 carries the three paralleling leads 22 out to the ground from the paralleling contacts 21. An A.C. power plug 59 brings in the three-phase power from the aircraft alternator 11 on pins D, B, and F.

The actuator 54 in the load switch assembly 15 is a D.C. motor having a mechanically-connected limit switch 60 wired in the two control leads to pins D and F. In this arrangement, application of voltage to the "aircraft" pin D will energize the actuator 54 to the "aircraft" position, whereupon limit switch 60 will open the "aircraft" circuit and close the "external" circuit, thus stopping the actuator and setting up the "external" circuit for operation in the same direction to the "external" position when operating voltage is next applied at pin F. It will be seen from the description to follow that the load switching means in the assembly 15 is continuously rotatable in the same direction, the respective "aircraft" and "external" positions thereof being 90 degrees apart. An electrically disengaged brake may be incorporated, if desired, in the actuator 54.

The dash lines 62 from actuator 54 indicate mechanical connections to the aforesaid limit switch 60, to the bus contacts 17 and 17a for both D.C. and A.C. busses 16 and 20, to the auxiliary switches 56, and to the paralleling contacts 21.

Auxiliary switches 56 are for operating various external circuits (not shown) such as indicators or circuits requiring contacts to make or interrupt current. The purpose of paralleling contacts 21 has already been described.

Figure 3:
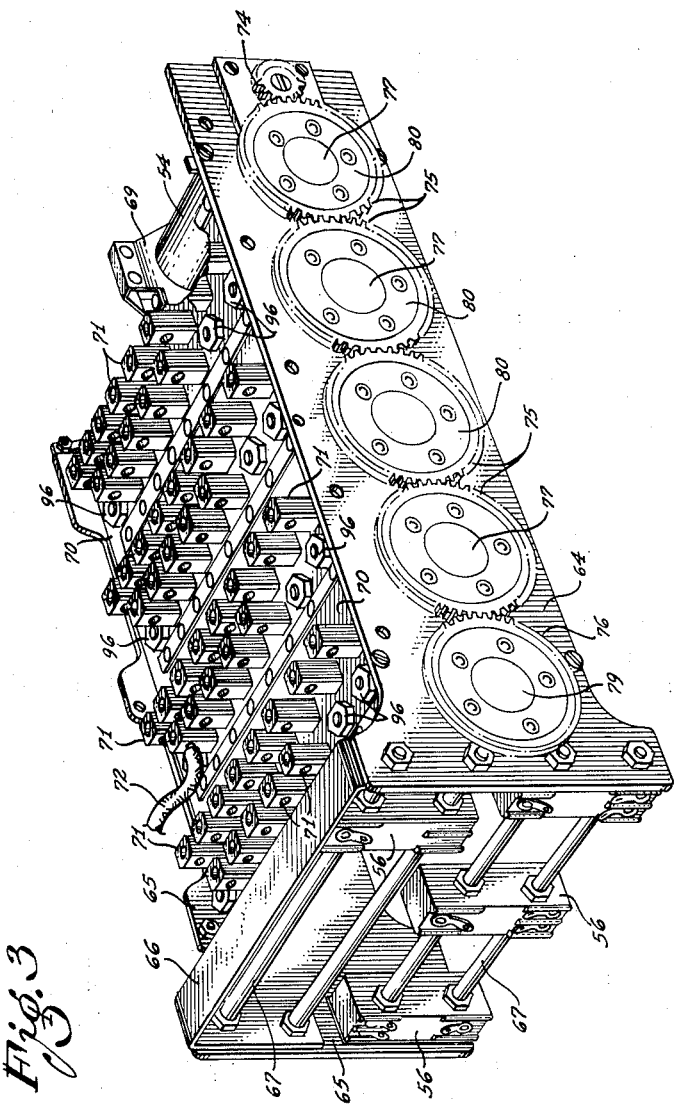
Figure 3 is a perspective view of the interior assembly of the complete aircraft load switch, showing the motor-actuated shafts and outer solder terminals of the switch contacts.
Figure 4:
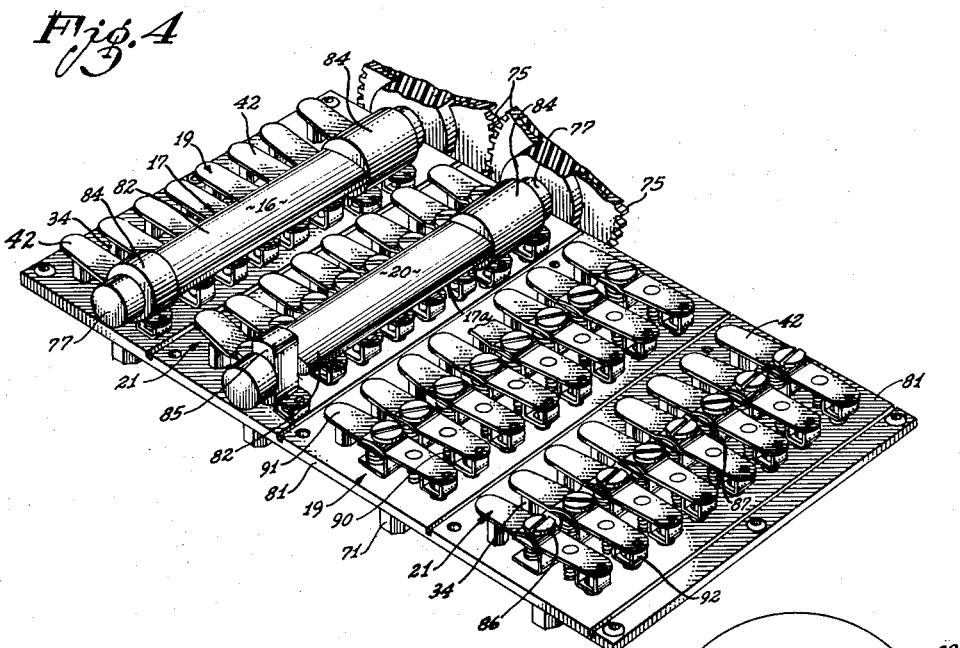
Figure 4 is a perspective view of the inner portion of the interior assembly of Figure 3, showing two of the rotatable bus bars on a plurality of switch arms of an inner switch deck.
Figure 5:
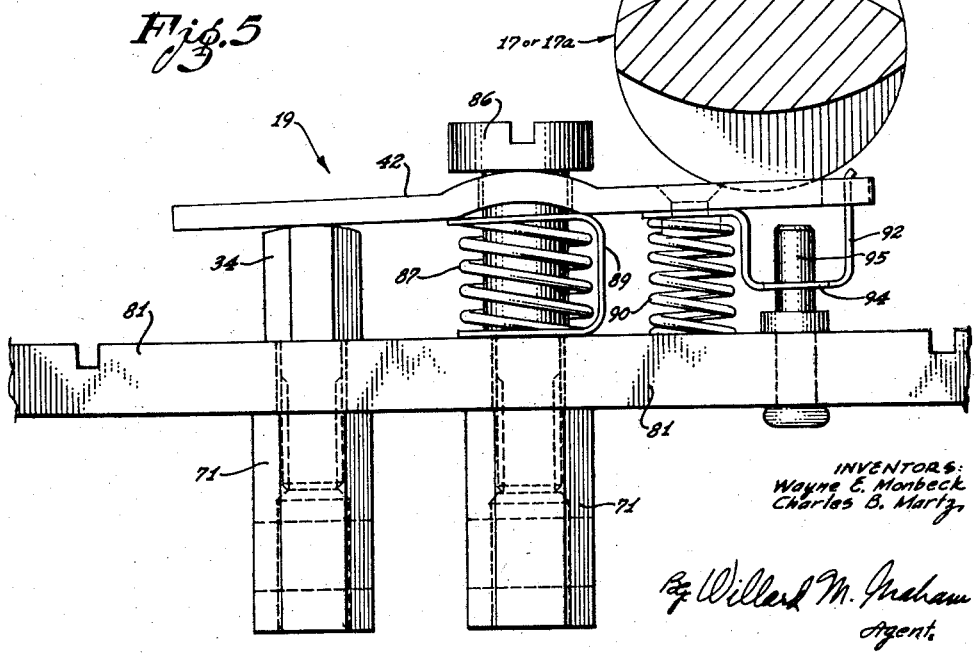
Figure 5 is an elevation edge view of a section of a switch deck, showing a spring-loaded contact arm assembly and referencing the operating position of a bus bar.

Physically, the load switch assembly 15 is internally constructed as shown in Figures 3, 4, and 5. Referring to Figure 3, the interior assembly shown is completely enclosed in a housing (not shown) which contains all the external connecting plugs previously mentioned, and mounting provisions for installing the assembly in an aircraft. The interior assembly comprises two side plates 64, 65, two end plates (not shown), auxiliary switch mounting bracket 66, switch mounting rods 67, an actuator mounting bracket 69, and two spaced, back-to-back switch decks, the upper one 70 of which appears in this view. Solder terminals 71, two for each load switch 19, come through the upper deck 70 from the switch contacts themselves, which are on the opposite side of the deck 70. Wire leads such as 72 extend from the solder terminals 71 to the plugs in the surrounding housing.

The D.C. motor actuator 54 is partly shown at the right-hand end in Figure 3, and carries a drive pinion 74 mounted on the end of a motor output shaft on the outside of the near side plate 64. Four bus bar gears 75 and one cam shaft gear 76 mate together in series and are driven by the drive pinion 74. These large gears are respectively secured to rotatable bus bar shafts 77 and to a rotatable cam shaft 79, the gears being electrically insulated from their driven shafts by insulating non-metal hubs 80.

Within the assembly, the bus bar shafts 77 extend across beneath the upper switch deck 70 shown in Figure 3 and above a lower deck 81 shown in Figure 4, and are rotatably mounted at each end in the side plates 64, 65. Side plates 64, 65 and switch decks 70 and 81 are also made of an insulating material, such as fabric base phenolic, since it is necessary to insulate the bus bar shafts 77 from each other.

Cam shaft 79 is provided with the desired cams (not shown) to operate the auxiliary switches 56 mounted on rods 67 at the left-hand end of the assembly in Figure 3.

Figure 4 discloses that the bus bar shafts 77 are shaped to operate the various required load switches 19. The left-hand shaft in this figure comprises in its entirety the D.C. bus 16, shown schematically in Figure 2. The next shaft comprises one of the A.C. phase busses 20, which is followed by the other two identical A.C. phase busses (not shown in Figure 4).

The D.C. bus 16 comprises a central oblong section 82 which forms the bus contacts 17 previously mentioned, and two circular end sections 84 of different lengths which form the "pole" contact or contacts by which the D.C. input power is fed to the bus from pins A, B, and C of D.C. power plug 52 in Figure 2. Dimensions are such that when assembled, the circular end sections 84 are in spring-loaded operating contact with three of the movable contacts 42 on the lower deck 81 and also with the corresponding three of the upper deck 70 which will be inverted directly above, on top of the busses 16 and 20 shown in Figure 4.

Each of the A.C. busses 20 also comprises an oblong central section 82 which forms the bus contacts 17a of one A.C. phase, and a circular section 84 at one end which forms the continuous A.C. input connection from the A.C. power plug 59 to one phase bus 20. The opposite end of each A.C. bus 20 carries a 90-degree shifted oblong segment 85 which forms the actuating part of one of the paralleling contacts 21 previously mentioned.

Figures 4 and 5 taken together show the load switches 19, which are identical for D.C. and A.C. Reference number 34 is the fixed contact, 42 is the movable contact, and 17 and 17a are the bus contacts which are illustrated by a portion of one of the central oblong sections 82 in Figure 5. Fixed contact 34 goes through the switch deck 81 and fastens to one of the screw type solder terminals 71. Movable contact 42 is a rocking arm in contact with a screw post 86 which goes through the deck and is fastened to another solder terminal 71. A terminal spring 87 and a shunt 89 are installed around the screw post 86 between the deck 81 and the movable contact 42 to assure good electrical contact at this central fulcrum point. A contact spring 90 is installed between the deck 81 and the movable contact 42 on the side opposite the fixed contact 34 to maintain good electrical contact between the movable contact 42 and the fixed contact 34 when the load switch 19 is in the "external" position illustrated.

The bus contact 17, when rotated 90 degrees from the position shown, will strike the movable contact 42 just beyond the contact spring 90, thus closing the circuit directly from the aircraft power supply to the load, and then lift the movable contact 42 off of the fixed contact 34, thus opening the circuit from the external paralleling circuitry to the load. Also it is seen that at this time the paralleling contacts 21 will be opened by virtue of the fact that the A.C. bus represented by the 90 degree shifted segment 85 is separated from the contact arm 91 forming the other side of the paralleling contact 21.

A guide 92 with a slot 94 therein, attached to one end of the movable contact 42, and a pin 95 attached to the switch deck 81 and extending through the slot 94, keep the movable contact 42 operating in the proper plane so that it will not rotate around the screw post 86.

As seen in Figure 3, no soldering terminals are attached to the fixed contacts 34 of the deck switch parts forming the paralleling contacts 21 or the continuous bus supply contacts at the gear end of the busses, since only the bus contact itself and the movable contact 42 are used. At these places, a plain nut 96 is attached to the fixed contact 34 on the back side of the switch decks 70 and 81.

The busses 16 and 20 are made of hard copper, preferably, and the terminals and contacts of the load switches may be copper or brass, for example. Sufficient ruggedness, contact area and contact force of the various components are enabled by the present design to allow, as in one actual embodiment, 50 amperes A.C. or D.C. carrying capacity for each load switch, 200 amperes total for the D.C. bus 16, 170 amperes per phase for the A.C. busses 20, and 170 amperes for each set of paralleling contacts 21. These paralleling contacts 21 need not be rated so high if in actual practice the total of the aircraft A.C. loads are not switched on until after A.C. power is transferred to the aircraft and the load switch assembly 15 actuated from "external" to "aircraft."

When the motor actuator 54 is energized, the busses 16 and 20 are rotated 90 degrees in about 2½ or 3 seconds maximum. Since actual transfer of power is made via the transfer relay contacts 27 and 30 in the ground equipment, no electrical load-making or load-interrupting is required of the load switch contacts in the aircraft. Hence, a very compact and light-weight load switch assembly 15 can be designed, which reduces airborne weight in one instance from about 200 pounds to 28 pounds. Further, the location of manual circuit controls and protective devices such as circuit breakers and fuses (not shown) can be located on the ground support equipment rather than on the aircraft or missile.

In the present specification, the number of load switches shown is not intended to be a maximum, since obviously more load switches per bus can be added widthwise of the assembly 15, and/or more buses added without departing from the basic system. In fact, the drawings shown herein do not necessarily depict the various parts to scale, but have been chosen and arranged for clarity of illustration.

The auxiliary switches 56 used for indicator circuits, possible sequence control circuits, and the like, are actuated from the cam shaft 79 during the time the load switch assembly 15 is being switched by the actuator 54.

In a slightly modified design of load switch assembly, wiring from the various switch contacts to external plugs could be routed differently so that the leads going out to the ground equipment would be segregated together in one series of plugs which would themselves form the disconnect points 51 mentioned hereinbefore. This would enable the load switch assembly 15 to be installed with the face containing the disconnectable umbilical plugs substantially flush with a skin cut-out or access panel in the aircraft exterior surface.

It is thus seen that a load transfer system is provided having a minimum weight and maximum reliabilty, combined with the automatic features mentioned in the listing of objects presented in the introduction to this specification. The motor-actuated load switch assembly with rotating bus bars provides positive action and effective locking in each end position, thereby eliminating the need for holding relay coils, armatures, and electric current consumption to hold the switches in one position or the other, and at the same time insuring that high accelerations or vibrations will not trip the load switches out of the "aircraft" position. If desired, a stored energy trigger-type of action could be used instead of the motor actuator to reduce the actuating time substantially below 2½ seconds.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

We claim:

1. In an electrical load transfer system, make-before-break switching means comprising a rotatable bus bar, a fixed contact, and a movable contact having a spring-loaded contact with said fixed contact, said switching means having a first position where said fixed and movable contacts are closed and said bus bar is open, and a second position where said bus bar is rotated and closed with said movable contact to leave said fixed contact open.

2. Apparatus in accordance with claim 1 wherein said bus bar is in equilibrium in said second position, so that the spring load on said movable contact has no rotative moment of force on said bus bar.

3. Apparatus in accordance with claim 1 including stationary terminal means having a continuous wiping contact with said bus bar.

4. Apparatus in accordance with claim 1 wherein said bus bar is symmetrical about a fixed axis of rotation in said switching means, and including positive-drive actuating means connected to said bus bar for rotation thereof.

5. Apparatus in accordance with claim 1 including a plurality of said fixed contacts and a plurality of said movable contacts associated respectively in pairs with said bus bar.

6. In an electrical load transfer system, make-before-break switching means comprising an actuator, a rotatable bus bar having a positive driven connection with said actuator, said bus bar mounted in a framework and being insulated from said framework and from said actuator; a plurality of switches insulated from each other and each comprising a fixed contact in said framework, a movable rocker contact substantially centrally mounted on a conducting fulcrum post in said framework, and elastic means normally urging a first end of said movable contact closed against said fixed contact; said bus bar having a cam-like oblong section positioned adjacent a second end of said movable contacts; said switching means having a first position where said oblong section does not touch said movable contacts and a second position where said bus bar is rotated to put said oblong section in contact with said second ends of said movable contacts and also to thereby rock said movable contacts against said elastic means to separate said first ends from said fixed contacts.

7. Apparatus in accordance with claim 6 wherein said plurality of switches is on one side of said bus bar, and including another plurality of similar switches on the opposite side of said bus bar, so placed that opposite edges of said oblong section operate both pluralities of switches substantially simultaneously.

8. Apparatus in accordance with claim 6 wherein said bus bar has a second cam-like oblong section positioned adjacent one of said switches and oriented at 90 degrees to the first said oblong section, whereby said second oblong section closes its associated switch while said first oblong section opens its associated switches.

9. Apparatus in accordance with claim 6 wherein said actuator is an electric motor having an output pinion, a gear on said bus bar engaged with said pinion, and limit means for stopping said actuator after said bus bar has been rotated 90 degrees thereby, said bus bar being symmetrical about its center of rotation, and said second position being where the line of force through said oblong section holding said movable contacts open from said fixed contacts passes through said center of rotation, whereby no moment of force is applied to said bus bar by said movable contacts in said second position.

10. An electrical load transfer system between two power supplies and a load, comprising a load switch assembly as recited in claim 6, continuous-contact means connecting said bus bar to one of said power supplies, means connecting said movable contacts to the other of said power supplies, and means connecting said fixed contacts to independent portions of said load.

References Cited in the file of this patent

UNITED STATES PATENTS

| | | |
|---|---|---|
| 2,410,677 | Parkhurst | Nov. 5, 1946 |
| 2,494,313 | Rowe | Jan. 10, 1950 |